United States Patent [19]

Brager

[11] 4,112,533
[45] Sep. 12, 1978

[54] INTERIOR-EXTERIOR TRUCK BODY WASH

[76] Inventor: Douglas R. Brager, 707 6th St., East Missoula, Mont. 59801

[21] Appl. No.: 730,642

[22] Filed: Oct. 7, 1976

[51] Int. Cl.² .............................................. B60S 3/06
[52] U.S. Cl. .................................. 15/53 A; 15/DIG. 4
[58] Field of Search ................... 15/4, DIG. 2, 21 R, 15/21 D, 21 E, 53 R, 53 A, 53 AB, 104.1 R, 104.1 C, 104.05, 88, 56; 134/167 C, 8

[56] References Cited

U.S. PATENT DOCUMENTS

| 3,439,372 | 4/1969 | Collier | 15/53 A |
| 3,460,177 | 8/1969 | Rhinehart et al. | 15/53 A |
| 3,551,934 | 1/1971 | Franzreb | 15/53 A |
| 3,689,318 | 9/1972 | Phillips | 15/21 E |
| 3,758,906 | 9/1973 | Takeuchi | 15/53 A |
| 3,961,983 | 6/1976 | Crandall et al. | 15/21 E |

FOREIGN PATENT DOCUMENTS

1,936,889  1/1971  Fed. Rep. of Germany ...... 15/DIG. 2

*Primary Examiner*—Edward L. Roberts
*Attorney, Agent, or Firm*—Sughrue, Rothwell, Mion, Zinn and Macpeak

[57] ABSTRACT

A more or less conventional back and forth shiftable spray and rotary brush assembly is provided for movement back and forth along the external surfaces of a trailer body to be washed and includes opposite side portions from which inwardly projectable and outwardly retractable wheel washing brushes are supported. This component of the invention is utilized to wash the exterior of a trailer body. The invention further includes an elongated extendable boom structure having a base and free ends. A carriage is provided from which the boom is supported in horizontal position with the base end of the boom supported from the carriage and the free end of the boom extendable relative to the carriage. The carriage is shiftable back and forth along a horizontal path extending transversely of the boom and may be moved into registry behind a trailer from a position disposed along one side of the trailer after the latter has been moved forwardly to a position just forwardly of the back and forth path of movement of the carriage. When the carriage is moved into position in alignment with the rear of a trailer having been moved into washing position, the free end of the boom, which carries a washing head assembly, is extended relative to the base end of the boom and the carriage into the rear of the trailer and forwardly through the interior of the trailer. The washing head assembly is operative to thoroughly wash and rinse the interior of the trailer during its forward movement through the interior thereof and its rearward movement therethrough upon retraction of the boom.

16 Claims, 11 Drawing Figures

INTERIOR-EXTERIOR TRUCK BODY WASH

BACKGROUND OF THE INVENTION

Various forms of washing assemblies have been provided for washing both the exterior and interior surfaces of large trailers and other vehicle bodies. There is little difficulty in providing structure for cleaning the external surfaces of trailer bodies inasmuch as the trailer may be driven into the washing position and a generally U-shaped washing assembly may be traversed back and forth along the trailer in order to wash the external surfaces of the opposite sides and top of the trailer. However, the major difficulty resides in providing a structure for adequately washing the internal surfaces of a trailer. Some washing devices have been provided with horizontally swingable booms having washing heads on the free ends thereof and the booms may be swung into and out of washing position within an associated trailer or other load body. In addition, other forms of washers include elongated booms disposed in horizontal position and rearwardly toward a trailer to be washed is backed so that the free end of the boom may be telescopingly received within the trailer. However, this type of construction requires difficult jockeying of the trailer. Still further other forms of interior trailer body washing devices include mobile frames which are driven into the rear of a trailer to be washed from a support platform registered with the open rear of the trailer. However, these different forms of interior trailer washing apparatus include structural and operational features which give rise to functional and operational problems.

Examples of various forms of washing devices for washing the interiors of various forms of vehicle bodies are disclosed in U.S. Pat. Nos. 3,461,889, 3,534,746, 3,689,318, 3,783,466, 3,795,928, 3,830,430 and 3,897,263.

BRIEF DESCRIPTION OF THE INVENTION

The trailer body washing apparatus of the instant invention utilizes a more or less conventional U-shaped structure for washing the external surfaces of a trailer body, but which includes improvement features thereof designed to accomplish the exterior washing function in an improved manner. In addition, the instant invention includes a novel structure for washing the interior of a truck body or the like consisting of a horizontal disposed extending boom structure mounted upon a carriage for back and forth movement along a horizontal path disposed at generally right angles relative to the boom. A trailer is first driven into position slightly past the interior washing structure and the carriage thereafter laterally shifts the boom into alignment with rear of the trailer. Then, the free end of the boom, which carries a washing head assembly, is extended forwardly into and through the interior of the trailer and thereafter retracted rearwardly through the trailer and outwardly of the rear end thereof to complete the interior washing operation. In this manner, the trailer to be washed may be driven forwardly into washing position and need not be moved until both the exterior and interior of the trailer body have been washed. Thereafter, the trailer is pulled forwardly from the washing area and the next trailer to be washed may be driven into the washing position.

The main object of this invention is to provide an apparatus for washing both the external and internal surfaces of a trailer or similar truck body.

Another object of this invention is to provide an exterior wash assembly of improved design.

Still another object of this invention is to provide an interior wash assembly which may be readily moved into washing position relative to a trailer driven forwardly into washing position.

Still another important object of this invention is to provide a truck body interior washing assembly which may be readily controlled by a single workman and is supported for various movements relative to the truck body to be washed in a manner such that miss positioning of the interior washing apparatus relative to the trailer body to be washed is substantially impossible.

A final object of this invention to be specifically enumerated herein is to provide a trailer wash structure for washing both the interior and exterior of a truck trailer and which will conform to conventional forms of manufacture, be of simple construction and easy to use so as to provide a device which will be economically feasible, long lasting and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
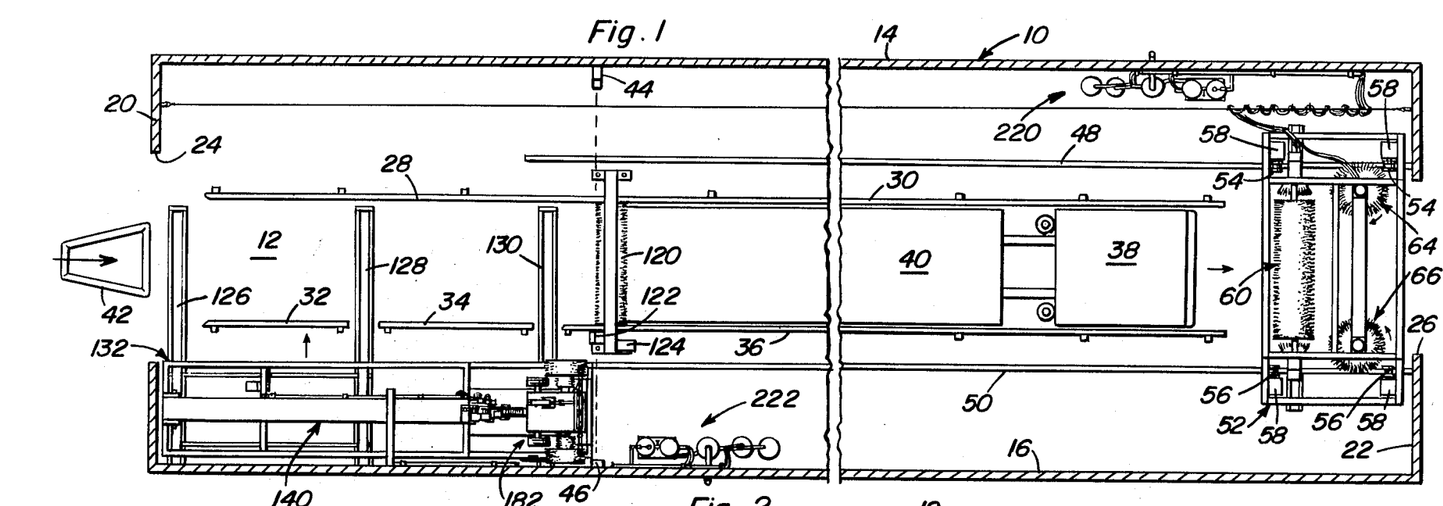
FIG. 1 is a top plan view of a stall into which a trailer to be washed may be driven and with which the trailer washing structure of the instant invention is operatively associated.
Figure 2:
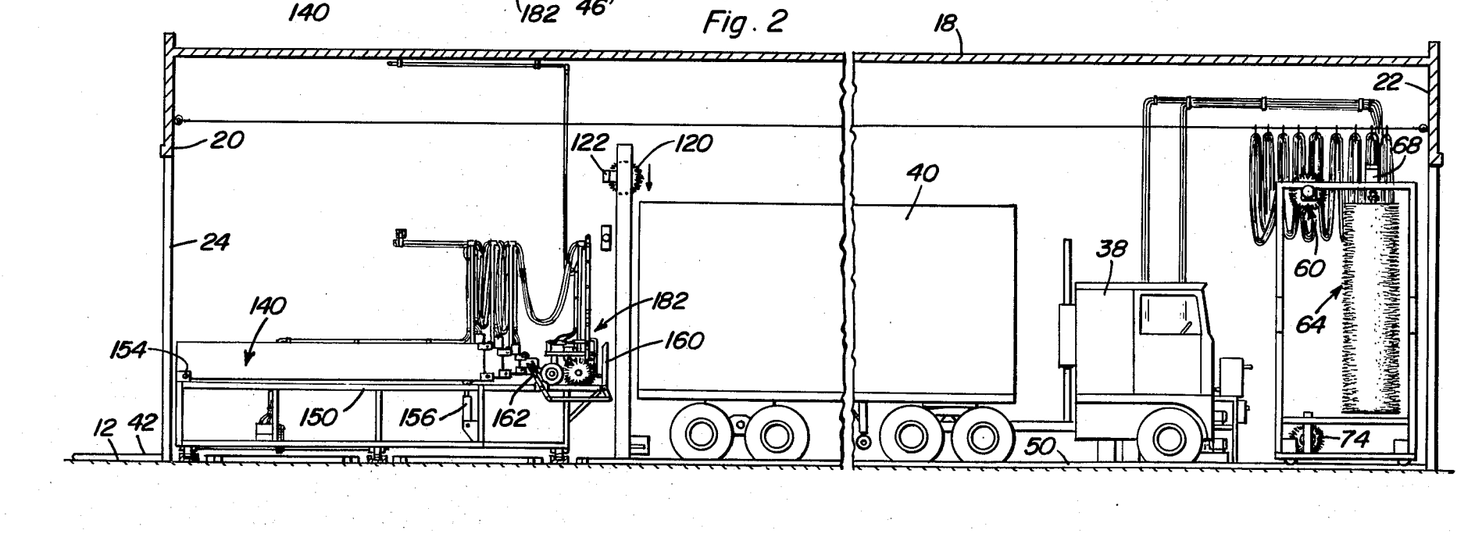
FIG. 2 is a side elevational view of the assemblage illustrated in FIG. 1.

Referring now more specifically to the drawings, the numeral 10 generally designates a stall structure through which a trailer to be washed on both the exterior and interior may be driven. The stall structure includes a floor 12, opposite side longitudinal walls 14 and 16, a top wall 18 extending between the side walls 14 and 16 and partial end walls 20 and 22 at opposite ends of the stall structure 10. The end walls 20 and 22 include openings 24 and 26 to provide for passage of a tractor and semi-trailer through the end walls 20 and 22.

The floor 12 includes spaced guide rails 28, 30, 32, 34 and 36 between which a tractor 38 and trailer 40 may be driven upon movement through the opening 24 toward the opening 26. The floor 12 extends outwardly of the end wall 20 and includes a central upwardly projecting guide structure 42 to assist in guiding the tractor 38 and trailer 40 into proper alignment with the path of intended movement defined between the guides or rails 28, 30, 32, 34 and 36.

An electric eye assembly including sending and receiving components 44 and 46 are mounted on walls 14 and 16 and acuates an audible or visual signal (now shown) to indicate to the driver of the tractor 38 when the rear of the trailer 40 has passed a straight line extending between the components 44 and 46.

Figure 9:
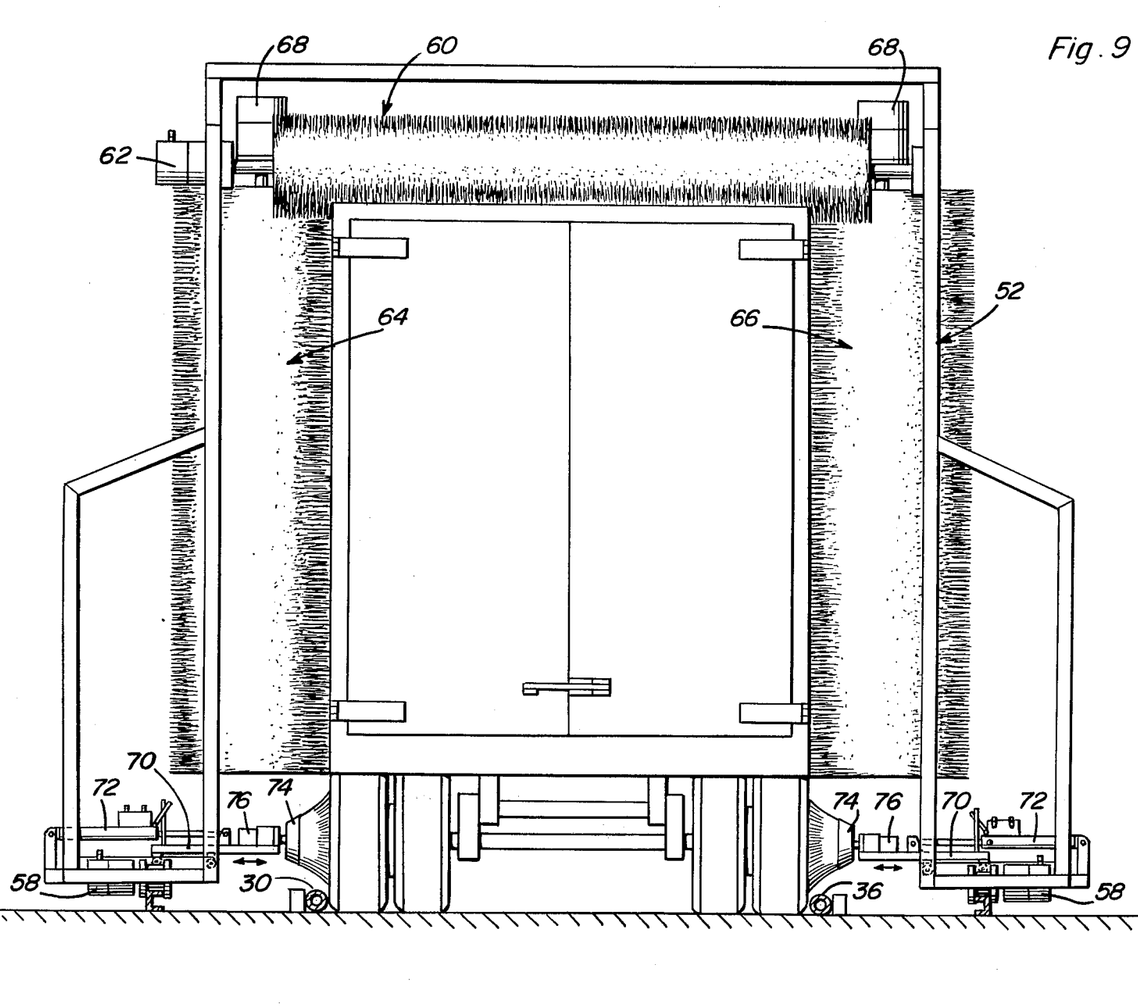
FIG. 9 is a rear elevational view illustrating the manner in which the exterior wash structure washes the exterior surfaces of the trailer and the wheel washing components thereof may be extended into wheel washing positions.

The stall 10 further includes a pair of longitudinal tracks 48 and 50 supported from the flooring 12 and a generally inverted U-shaped frame referred to in general by reference numeral 52 includes opposite side support wheels 54 and 56 which are rollingly engaged with the tracks 48 and 50 and are driven by hydraulic motors 58.

The frame 52 comprises the exterior wash assembly and includes an upper horizontal brush assembly 60 journaled therefrom and driven by a hydraulic motor 62 as well as upstanding opposite side brushes 64 and 66 journaled therefrom at their upper ends and driven by hydraulic motors 68, the brushes 64 and 66 being universally supported at their upper ends for at least slight horizontal deflection in all directions at their lower ends. The frame 52 additionally includes horizontally inwardly and outwardly shiftable carriages 70 under the control of extendable and retractable cylinders 72 and which support rotary brushes 74 driven by means of hydraulic motors 76 mounted on the carriages 70.

Figure 11:
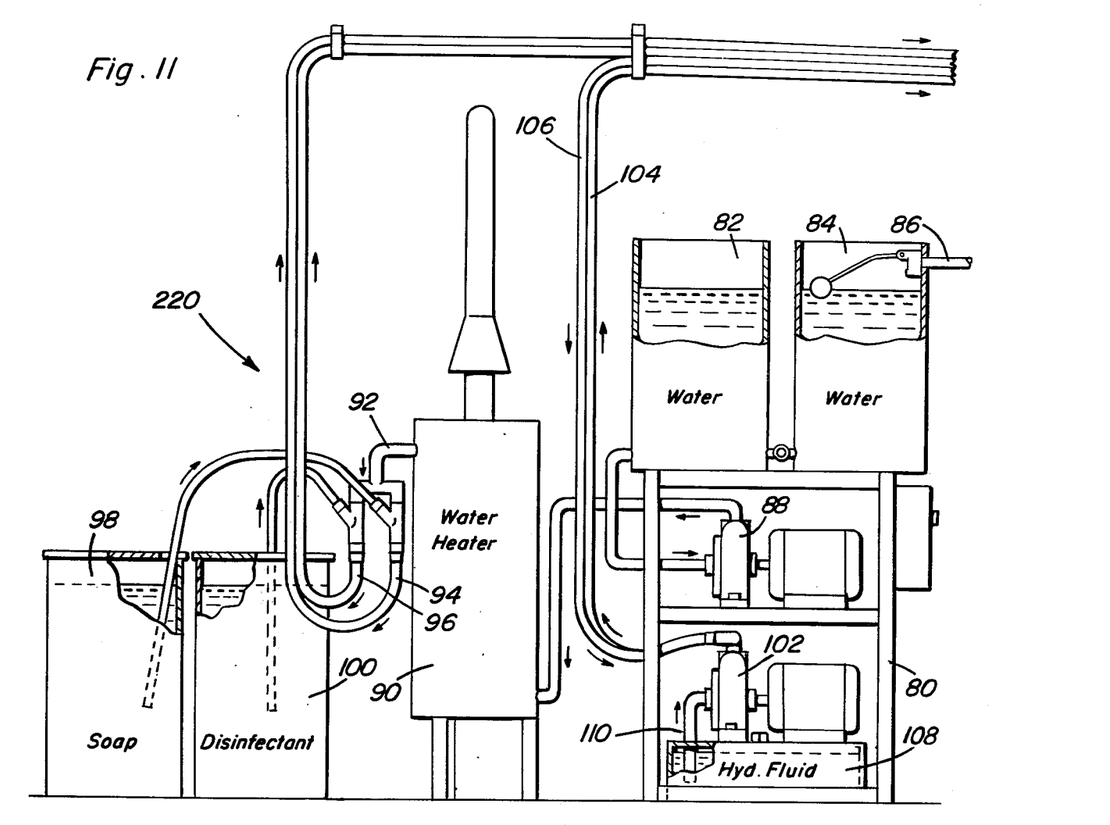
FIG. 11 is an enlarged side elevational view of the water, disinfectant, soap and hyraulic power sources for the trailer exterior washing structure, the trailer interior washing structure being provided with similar supported structures.

With attention now invited more specifically to FIG. 11, it will be seen that a stand 80 is provided and supports a pair of interconnected water tanks 82 and 84, the tank 84 having a flow controlled water supply pipe 86 opening thereinto. The stand 80 includes a motor driven pump 88 for pumping water from the tanks 82 and 84 through a hot water heater 90, and the hot water heater 90 includes a discharge pipe 92 including two branch lines 94 and 96 into which soap and disinfectant are drawn by venturi action from soap and disinfectant tanks 98 and 100. In addition, the stand 80 includes a motor driven hydraulic pump 102 and a supply line 104 extends from the pump 102. A return line 106 returns to the hydraulic fluid reservoir 108 disposed beneath the pump 102 and downwardly into which the inlet 110 for the pump 102 extends.

In operation, after the tractor 38 and the trailer 40 have been moved into the positions thereof illustrated in FIGS. 1 and 2 of the drawings, the exterior wash assembly is actuated whereby hydraulic fluid will be supplied to the motors 58, the motor 62 and the motors 68. The wheels 54 and 56 will therefore be rotated in order to propel the frame 52 rearwardly along the tracks 48 and 50 and the brushes 60, 62 and 64 will be rotated. In addition, the pump 88 is actuated whereupon water will be pumped through the heater 90. During rearward movement of the frame 52, a valve (not shown) opens in the line 94 adjacent the frame 52 and soapy, hot water is sprayed onto the brushes and onto the sides and top of the trailer 40 whereby the external opposite side and top surfaces thereof will be washed upon contact of the rotary brushes 60, 64 and 66 with the trailer 40. In addition, when the frame 52 passes the tractor 38, the brushes 64 and 66 will also wash the opposite sides of the tractor 38. Also, when the brushes 74 are registered with the front wheels of the tractor, the frame 52 is momentarily stopped and the cylinders 72 are actuated to extend the brushes 74 inwardly to engage the wheels of the tractor. When the brushes 74 have been inwardly displaced sufficiently to contact the wheels, the motors 76 are automatically actuated and an additional valve pipes hot, soapy water to the brushes 74. As the frame 52 continues rearwardly along the trailer 40, the wheels of the tandem axles of the tractor 38 are also washed and the tandem wheels of the trailer 40 are washed as the brushes 74 are registered therewith. After rearward movement of the frame 52 has been completed sufficient to wash the entire exterior of the tractor 38 and trailer 40, the motors 58 are reversed and the valve for the hot, soapy water line 94 is closed and a corresponding valve (not shown) for the hot rinse water line 96 is opened whereby return forward movement of the frame 52 to the position thereof illustrated in FIG. 1 will cause the exterior of the tractor and trailer to be rinsed. Additionally, a rear vertically shiftable brush 120 driven by a motor 122 and vertically shiftable by means of a motor 124 may be utilized to wash the rear of the trailer 40 by actuating the brush 120, a supply of hot, soapy water thereto and lowering the brush 120 across the rear of the trailer 40 after which the brush 120 is supplied with heated rinse water.

Figure 8:
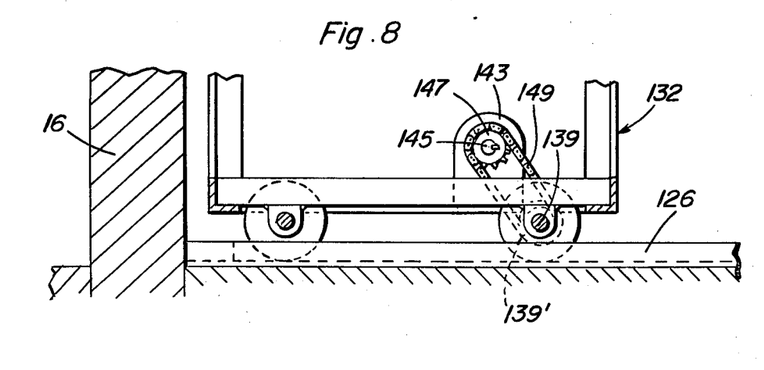
FIG. 8 is an enlarged fragmentary transverse vertical sectional view illustrating the drive assembly for the carriage from which the extendable boom is supported.

The floor 12 includes three transverse tracks 126, 128 and 130, see FIGS. 1, 2 and 8, and a carriage referred to in general by the reference numeral 132 includes pairs of wheels 134, 136 and 138 rollingly engaged with tracks 126, 128 and 130. One pair of corresponding wheels 134 and 136 are interconnected by means of a shaft 139 having a sprocket wheel 139' mounted thereon and the carriage 132 includes a hydraulic motor 143 including an output shaft 145 having a drive sprocket 147 mounted thereon, and an endless chain 149 drivingly connects the sprocket 147 to the sprocket 139'. The motor 143 is reversible and therefore may be utilized to drive the carriage 132 back and forth along the tracks 126, 128 and 130. From FIG. 1 of the drawings, it may be seen that the carriage 132 may be driven to one set of corresponding ends of the tracks 126, 128 and 130 disposed to one side of the path of movement of the tractor and semi-trailer 40 between the rails 30 and 36 and a position disposed immediately to the rear of and in longitudinal alignment with the trailer 40 at the other ends of the tracks 126, 128 and 130.

Figure 3:
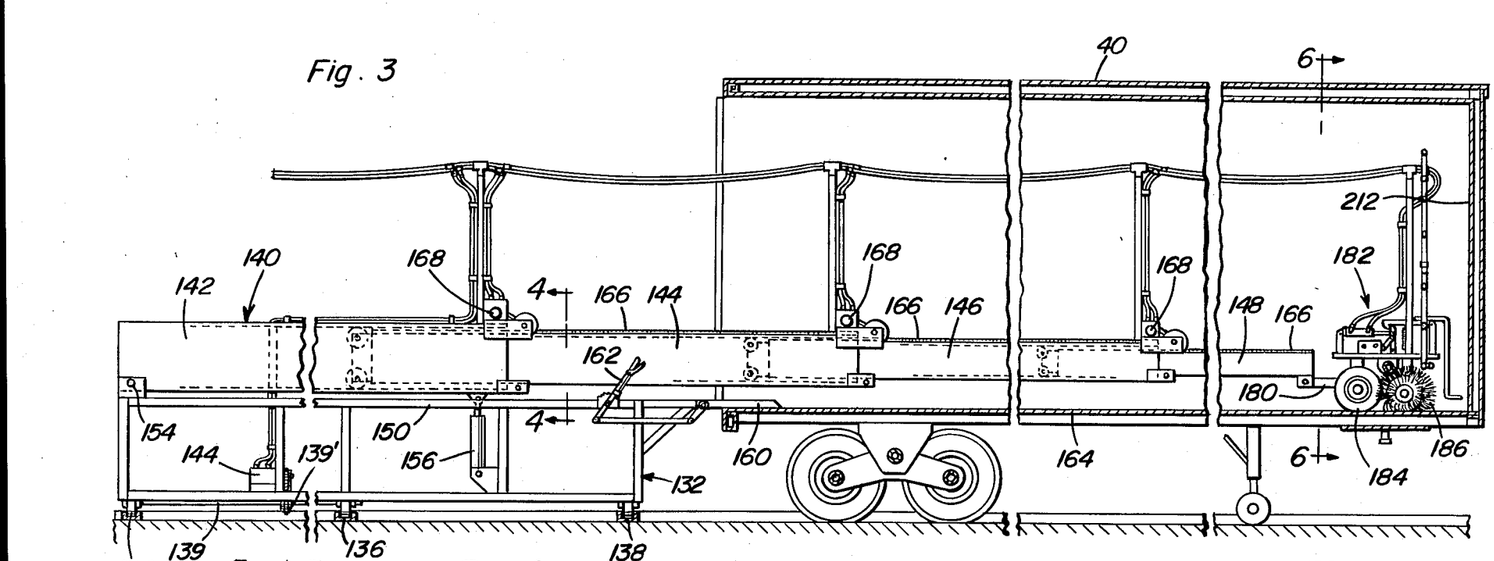
FIG. 3 is a fragmentary enlarged longitudinal vertical sectional view illustrating the interior wash structure of the instant invention in a fully extended position within an associated trailer body to be washed.

A horizontal boom assembly referred to in general by the reference numeral 140 including a base section 142, intermediate sections 144 and 146, and a free end section 148 has its base section 142 pivotally supported from the top 150 of the carriage 132 at pivot connection 154. Hydraulic cylinder 156 is connected between a lower portion of the carriage 132 and the lower portion of the base section 142 of boom 140 whereby the forward end of the boom 140 may be slightly raised and lowered. In addition, the forward end of the carriage 132 includes a swingable bridge 160, under the control of a lever 162 and the bridge 160 may be swung from the horizontal position thereof bridging the distance between the top 150 and the floor 164 of the trailer 40.

Figure 4:
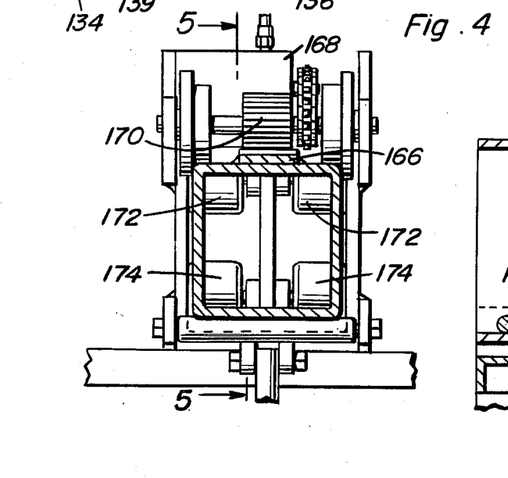
FIG. 4 is an enlarged fragmentary transverse vertical sectional view taken substantially upon the plane indicated by section line 4—4 of FIG. 3.
Figure 5:
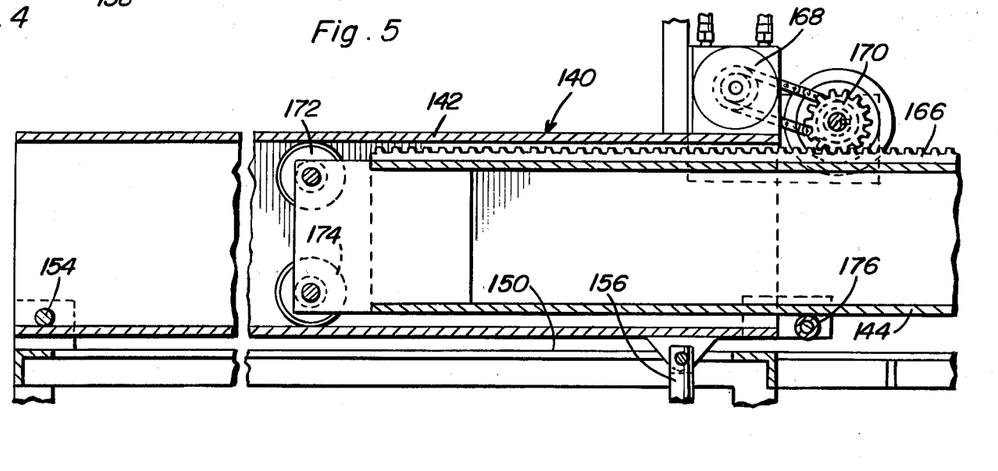
FIG. 5 is a fragmentary vertical sectional view taken substantially upon the plane indicated by the section line 5—5 of FIG. 4.
Figure 6:
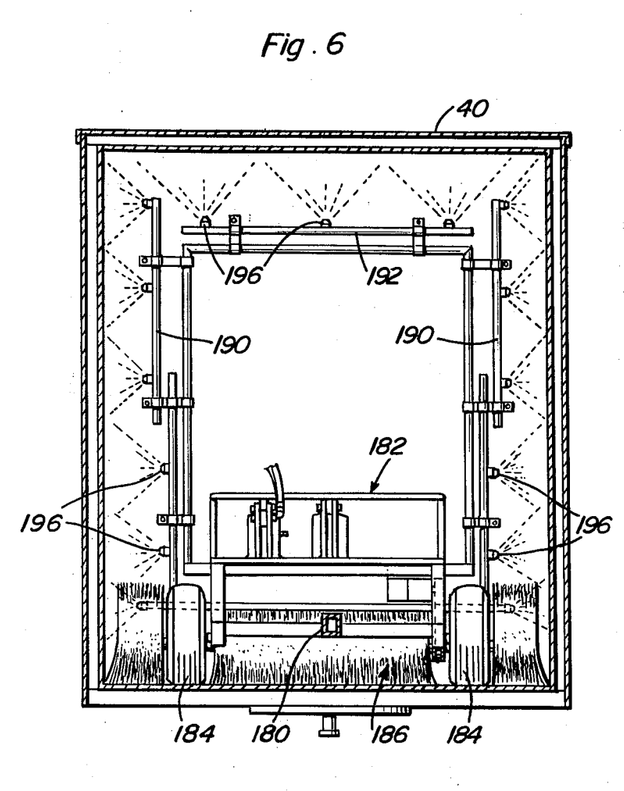
FIG. 6 is an enlarged fragmentary transverse vertical sectional view taken substantially upon the plane indicated by the section line 6—6 of FIG. 3.

Each of the sections 144, 146 and 148 includes a rack gear 166 supported therefrom and each of the sections 142, 144 and 146 include hydraulic motor 168 supported therefrom which drives a gear wheel 170 meshed with the corresponding rack gear 166. Thus, the sections 144, 146 and 148 may be extended and retracted relative to the sections 142, 144 and 146, respectively. Further, each of the sections 144, 146 and 148 includes upper and lower rollers 172 and 174 rollingly engaged with the upper and lower inner surfaces of the sections with which they are telescopingly engaged and the sections 142, 144 and 146 additionally include lower rollers 176 at their forward ends which rollingly engage the sections 144, 146 and 148, respectively.

Figure 7:
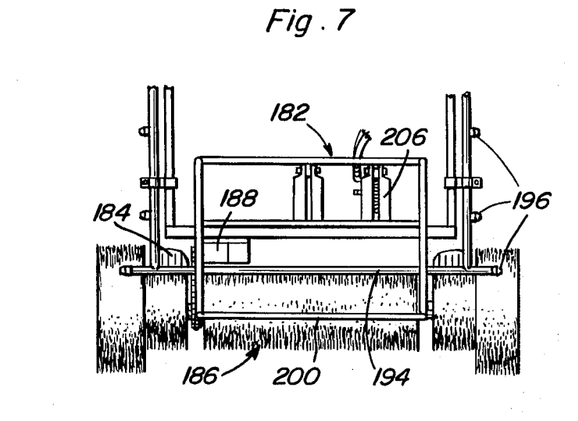
FIG. 7 is a fragmentary front elevational view of the washing head assembly of the extendable boom portion of the interior wash structure.

The raised inoperative position of bridge 160 may be seen in FIG. 2 as may the fully retracted position of the boom assembly 140. The free end of the section 148 includes a forwardly projecting support arm 180 connected at its forward end to a wheeled washing head assembly referred to in general by the reference numeral 182. The washing head assembly 182 includes a pair of opposite side support wheels 184 for rolling over the floor 164 of the trailer 140 and the top 150 of the carriage 132 as well as the bridge 160 when the latter is in the lowered position. In addition, the head assembly 182 includes a low horizontal floor scrubbing brush 186 driven by a hydraulic motor 188 and the head assembly, upstanding opposite side spray head manifolds 190 and an upper spray head manifold 192 as well as a lower forward spray manifold 194. Each of the manifolds 190, 192 and 194 includes a plurality of spray heads 196 spaced therealong, and water for the manifolds 190, 192 and 194 is supplied thereto through lines corresponding to the lines 94 and 96. In addition, hydraulic fluid is supplied to the motor 188 through lines corresponding to the lines 104 and 106, and the forward end of the head assembly 182 includes an abutment lever 200 pivotally supported therefrom as at 202 and including a hooked arm 204 under the biasing action of an expansion spring 206. The hooked arm 204 is engaged over the upper end of a pivotally supported control link 208, and the control link 208 is operatively connected to a reversing valve 210 for automatically reversing operation of the motors 168 when the free end of the lever 200 engages the inner surface of the forward wall 212 of the trailer 40. A hydraulic cylinder 214 is provided and enjoys a lost motion connection with the link 208 and may be utilized to return the link 208 to the position thereof illustrated in FIG. 10 of the drawings after the link 208 has been swung in a counterclockwise direction under the biasing action of the expansion spring 216 connected thereto upon the hooked arm 204 of the lever 200 being raised by contact of the lever 200 with the inner surface of the forward wall 212 of the trailer 40.

In operation, the trailer 40 is pulled into the position thereof illustrated in FIG. 1 and the exterior of the tractor 38 and trailer 40 may be washed as hereinbefore set forth. However, while the exterior of the tractor 38 and trailer 40 are being washed, the motor 144 may be actuated to move the carriage 132 into position in registry with the rear of the trailer 40. Then, the bridge 160 may be lowered and the motors 168 may be actuated to begin extension of the sections 144, 146 and 148. At the same time, the motor 188 is actuated for driving the brush 186 and the valve supplying hot, soapy water to the nozzles 196 is opened. Actually, the carriage 132 may be placed into registry with the rear of the trailer 140 just prior to the exterior wash structure being actuated to wash the exterior of the tractor 38 and trailer 40. Then, as the motors 168 are slowly extending the sections 144, 146 and 148 in order to enable the head assembly 182 to thoroughly wash the interior of the trailer 40, the exterior wash structure may be traversed rearwardly along the tractor 38 and trailer 40. At approximately the same time the exterior wash structure moves to the rear of the trailer 40, the interior head assembly 182 will approach and engage the inner surface of the front wall 212 of the trailer 40 whereby the operation of the motors 168 will be reversed in order to begin retraction of the boom assembly 140. At the same time, the valve supplying hot, soapy water to the spray heads 196 is closed and heated disinfectant rinse water is supplied to the nozzles 196 whereby rearward movement of the head assembly 82 will cause the interior of the trailer 40 to be rinsed.

As soon as the boom assembly 40 has been fully retracted to the position thereof illustrated in FIG. 2, the bridge 160 may be raised to the position thereof illustrated in FIG. 2 of the drawings and the carriage motor 143 may be actuated in reverse direction to again return the carriage 132 to the position thereof illustrated in FIG. 1 of the drawings disposed to the side of the path along which the trailer was advanced into the washing position. Of course, as soon as the washing of the exterior of the tractor 38 and trailer 40 is completed the tractor 38 and trailer 40 may be driven forwardly through the opening 26 thereby leaving the stall 10 vacant so that a second tractor and trailer may be driven forwardly thereinto through the opening 24 and the washing process on the second tractor and trailer may be repeated.

Figure 10:
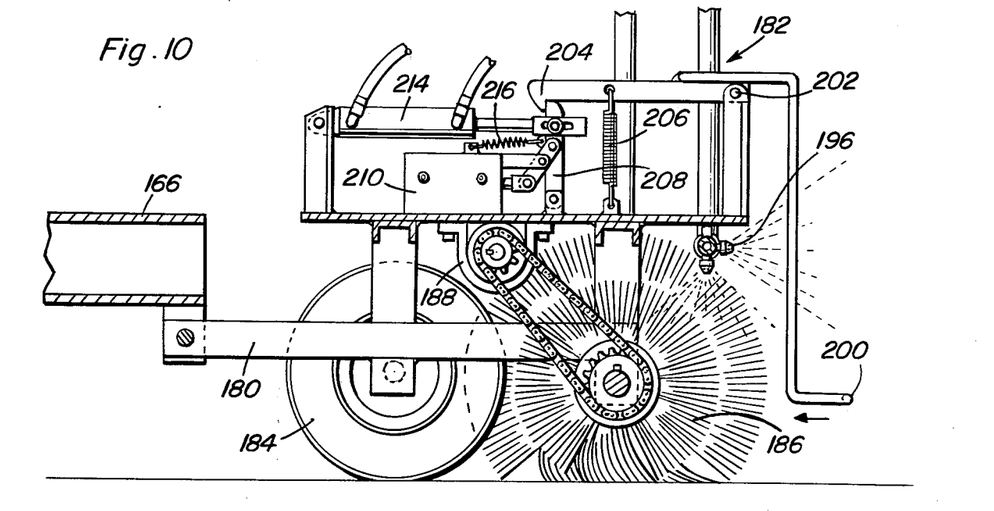
FIG. 10 is a fragmentary enlarged longitudinal vertical sectional view of the washing head assembly of the interior wash structure.

The supply and power units 220 and 222 illustrated in FIG. 1 and provided for the exterior and interior washing structures of FIGS. 9 and 10, respectively, may be of the same construction such as that illustrated in FIG. 11.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An apparatus for washing a trailer body of the type including a rear opening therein, said apparatus including an elongated extendable boom structure having base and free ends, support means supporting said boom structure from said base end in generally horizontal position and for generally horizontal lateral shifting, a washing head assembly carried by said free end, and means operative to selectively extend and retract said free end of said boom wherein said free end of said boom includes support wheel means for rollingly supporting said free end from and for movement along the inside floor of a trailer into which said free end is extended, said support means including a carriage from which said base end is supported, a support surface, means guidingly supporting said carriage from said surface for back and forth movement relative thereto in a horizontal path extending transversely of said boom, and said carriage including a horizontal surface upon which said wheel means is supported when said boom is retracted and a bridge structure positionable to bridge a narrow gap between said horizontal surface and the floor of a trailer behind which said carriage is registered.

2. The combination of claim 1 wherein said carriage supports said boom in elevated position relative to said support surface.

3. The combination of claim 2 wherein said support surface includes means defining a path of movement of a trailer to be washed thereover, said path generally paralleling said boom, said carriage being shiftable back and forth between a first position aligned with said path and a second position disposed to one side of said path.

4. The combination of claim 3 wherein said means defining a path includes a support surface over which a trailer may be driven and opposite side guide means disposed above said support surface and extending along said path for guiding engagement by the outer side surfaces of the wheels of a trailer moving along said path.

5. The combination of claim 1 wherein said washing head assembly includes a lower elongated and transversely extending powered rotary brush journaled therefrom for scrubbing the floor of the interior of said trailer.

6. The combination of claim 1 wherein said washing head assembly includes elongated upstanding opposite side supports and a lower elongated transverse support, said elongated supports each including a plurality of spray heads spaced therealong.

7. An apparatus as claimed in claim 1 further comprising, elongated track means relative to which said trailer may be disposed in parallel relation, a support mounted on said track means for movement therealong and including upstanding opposite side portions, a pair of powered vertically disposed elongated rotary brush assemblies journaled at their upper ends from upper portions of said opposite side portions and universally supported for limited lateral deflection of the lower ends thereof in all horizontal directions, and an upper horizontal elongated powered brush journaled from said support and extending between upper portions of said opposite side portions.

8. The combination of claim 7 including means operative to drive said support back and forth along said track means.

9. The combination of claim 7 wherein said support also includes powered inwardly facing rotary brushes journaled for rotation about horizontal axes extending transversely of said track means and supported from said support for selective inward and outward shifting.

10. A drive through trailer washer for washing the interior of a trailer body of the type including a rear opening therein when said trailer body is stationary, comprising:
(a) means having an entrance at one end and an exit at the opposite end for defining a trailer washing position, the direction between said entrance and exit defining a trailer longitudinal axis,
(b) a carriage structure moveable laterally from a first position offset from said longitudinal axis to a second position in line with said axis,
(c) boom means, attached to said carriage structure, for moving longitudinally into and out of said trailer when said trailer is at said washing position when said carriage is at said second position,
(d) cleaning means at one end of said boom for cleaning the interior of said trailer, and
(e) wheel means attached to said boom adjacent said one end thereof for rolling on the bottom of said trailer as said boom means moves longitudinally into and out of said trailer.

11. A drive through trailer washer as claimed in claim 10 wherein said boom means has a second end opposite said first end pivotally attached to said carriage.

12. A drive through trailer washer as claimed in claim 11 wherein said boom means comprises a plurality of structural members between said first and second ends each said structural member telescopically slidable into the next adjacent structural member nearer said second end and means for telescopically extending and retracting said structural members along said longitudinal axis.

13. A drive through trailer washer as claimed in claim 12 wherein said means for telescopically extending and retracting comprises,
separate hydraulic motor means attached to each of said structural members other than the last structural member at said first end, and
separate rack and pinion means responsive to each said hydraulic motor means, respectively, for retracting and extending said structural members.

14. A drive through trailer washer as claimed in claim 11 further comprising retractable bridge means on said carriage for bridging the gap between the end of said carriage and the interior floor of said trailer whereby said wheel can roll over said carriage and bridge into said trailer interior.

15. An apparatus for washing a trailer body of the type including a rear opening therein, said apparatus comprising:
(a) a support structure having a support surface,
(b) a boom pivotably attached to one end to said support structure and being extendable and retractable from moving the opposite free ends thereof into and out of the interior of a trailer body to be washed, said boom comprising a plurality of structural members between one and opposite ends, each said structural member except the one at said one end telescopically slidable into the next adjacent structural member nearer said one end, and means for telescopically extending and retracting said structural members,
(c) a retractable bridge means on said support structure for bridging the gap between the end of said support structure and the interior floor of a trailer body,
(d) cleaning means at said opposite end of said boom for cleaning the interior of a trailer, and
(e) wheel means attached to said boom adjacent said opposite end thereof for rolling over said support surface, said bridge and the interior of a trailer body as said boom moves longitudinally into and out of the trailer body.

16. An apparatus as claimed in claim 15 wherein said means for telescopically extending and retracting comprises:
(a) separate hydraulic motor means attached to each said structural members other than the last structural member at said opposite end, and
(b) separate rack and pinion means responsive to each said hydraulic motor means, respectively, for retracting and extending said structural members.

* * * * *

UNITED STATES PATENT AND TRADEMARK OFFICE
CERTIFICATE OF CORRECTION

PATENT NO. : 4,112,533
DATED : September 12, 1978
INVENTOR(S) : Douglas R. BRAGER It is certified that error appears in the above-identified patent and that said Letters Patent are hereby corrected as shown below:

IN THE SPECIFICATION:

Column 6, line 24 - delete "head assembly 82" insert -- head assembly 182 -- line 26 - delete "boom assembly 40" insert -- boom assembly 140 --

IN THE CLAIMS:

Column 8, line 37 - after "attached" delete "to" insert -- at --

Signed and Sealed this

Sixth Day of February 1979

[SEAL]

Attest:

RUTH C. MASON
*Attesting Officer*

DONALD W. BANNER
*Commissioner of Patents and Trademarks*